US012293626B2

(12) United States Patent
McClearen

(10) Patent No.: US 12,293,626 B2
(45) **Date of Patent: *May 6, 2025**

(54) ACCESSORY CONNECTION ASSEMBLY AND METHOD FOR AN ELECTRONIC GAMING MACHINE

(71) Applicant: Aristocrat Technologies, Inc., Las Vegas, NV (US)

(72) Inventor: Victor McClearen, Lewisburg, TN (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,755

(22) Filed: Jun. 23, 2023

(65) Prior Publication Data

US 2023/0334937 A1 Oct. 19, 2023

Related U.S. Application Data

(63) Continuation of application No. 16/890,938, filed on Jun. 2, 2020, now Pat. No. 11,721,162.

(Continued)

(51) Int. Cl.
*G07F 17/32* (2006.01)
*G07F 17/34* (2006.01)

(52) U.S. Cl.
CPC ...... *G07F 17/3213* (2013.01); *G07F 17/3216* (2013.01); *G07F 17/34* (2013.01)

(58) Field of Classification Search
CPC ... G07F 17/3213; G07F 17/3216; G07F 17/34
See application file for complete search history.

(56) References Cited

U.S. PATENT DOCUMENTS 6,102,394 A * 8/2000 Wurz ...................... G07F 17/32 273/138.2
7,017,955 B1 3/2006 Chiang
(Continued)

OTHER PUBLICATIONS

Southco, Draw Latches, www.southco.com/K2, www.southco.com/K3, www.southco.com/K4, www.southco.com/K5, 8 pages.
(Continued)

*Primary Examiner* — Robert J Utama
*Assistant Examiner* — Jeffrey K Wong
(74) *Attorney, Agent, or Firm* — Armstrong Teasdale LLP

(57) ABSTRACT

An electronic gaming machine includes a housing defining an internal cavity. The housing includes an exterior surface at least partially defining an opening extending through the housing and connecting with the cavity. The gaming machine also includes a main display coupled to the housing and configured to display a wagering game. A button deck assembly is removably coupled to the housing and includes a frame sized to extend at least partially through the opening and into the cavity when the button deck assembly is coupled to the housing. A connection assembly extends between the frame and the housing and includes a latch fixably mounted to one of the frame and the housing. The latch is configured to removably engage the other of the frame and the housing when the button deck assembly is coupled to the housing to secure the button deck assembly to the housing.

20 Claims, 16 Drawing Sheets

Related U.S. Application Data

(60) Provisional application No. 62/913,600, filed on Oct. 10, 2019.

(56) References Cited

U.S. PATENT DOCUMENTS 11,721,162 B2 * 8/2023 McClearen ......... G07F 17/3213 463/20
2003/0034656 A1 2/2003 Zemzik
2004/0018877 A1 * 1/2004 Tastad ..................... G07F 17/32 463/46
2005/0032578 A1 * 2/2005 Cole ................... G07F 17/3202 463/46
2008/0113740 A1 * 5/2008 McGahn ............. G07F 17/3216 463/20
2008/0132340 A1 * 6/2008 Haga ....................... G07F 17/32 463/46
2008/0179150 A1 7/2008 Tracy
2009/0280911 A1 * 11/2009 Tsao ........................ G07F 17/32 463/46
2012/0326987 A1 * 12/2012 Frojdh ................ G06F 3/04886 345/168
2015/0087401 A1 * 3/2015 Glenn, II ............ G07F 17/3211 463/25
2018/0075689 A1 * 3/2018 Castro ..................... A63F 13/28
2019/0096161 A1 * 3/2019 Barbour .............. G07F 17/3211
2020/0041049 A1 2/2020 Wallace

OTHER PUBLICATIONS

Office Action (Non-Final Rejection) dated Feb. 17, 2022 for U.S. Appl. No. 16/890,938 (pp. 1-16).
Office Action (Final Rejection) dated Oct. 5, 2022 for U.S. Appl. No. 16/890,938 (pp. 1-18).
Office Action (Notice of Allowance and Fees Due (PTOL-85)) dated Mar. 22, 2023 for U.S. Appl. No. 16/890,938 (pp. 1-11).
Office Action (Notice of Allowance and Fees Due (PTOL-85)) dated May 5, 2023 for U.S. Appl. No. 16/890,938 (pp. 1-4).

* cited by examiner

ACCESSORY CONNECTION ASSEMBLY AND METHOD FOR AN ELECTRONIC GAMING MACHINE

CROSS REFERENCE TO RELATED APPLICATIONS

The present application is a continuation of U.S. patent application Ser. No. 16/890,938, filed Jun. 2, 2020, which claims the benefit of and priority to U.S. Provisional Patent Application No. 62/913,600, filed Oct. 10, 2019, the disclosures of which are each hereby incorporated by reference in their entireties.

TECHNICAL FIELD

The field of disclosure relates generally to electronic gaming, and more particularly, to a fastening system for attaching a button deck assembly or other mechanism to an electronic gaming machine (EGM).

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit or value, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

For game play itself, player interfaces of EGMs typically include a number of mechanical pushbuttons for manual activation by a player to select game preferences, activate a game sequence, or otherwise provide input to the EGM. The mechanical pushbuttons are typically arranged in combination on a surface of the EGM cabinet that is often referred to as a "button deck". Some conventional button deck assemblies include dynamic mechanical pushbuttons. Generally, routine servicing of the button decks requires complete removal of the button decks from the EGMs. At least some known button decks are attached to an EGM by small threaded fasteners (e.g., miniature nuts and bolts). Oftentimes within the narrow confines of an EGM, such threaded fasteners are difficult to reach for installation and/or removal for servicing of the EGM. In many cases, the threaded fasteners are susceptible to being dropped by an operator during servicing and, in some cases, lost within the narrow confines of the EGM, potentially causing an operational failure in the EGM. Moreover, such threaded fasteners may require specific tool sets be used for installation and/or removal of the button deck assembly within the EGM, oftentimes resulting in lengthy servicing operations. Further, at least some threaded fastener systems require engagement between a threaded fastener and a steel plate of the button deck assembly. In many cases, application of excessive torque to such fasteners may result in deformation of the button deck assembly, requiring complete replacement of the button deck assembly. Accordingly, a button deck assembly that is selectively removable from an EGM by an operator is desirable.

SUMMARY

In one aspect, an electronic gaming machine is provided. The electronic gaming machine includes a housing defining an internal cavity. The housing includes an exterior surface at least partially defining an opening extending through the housing and connecting with the cavity. The electronic gaming machine also includes a main display coupled to the housing and configured to display a wagering game and a button deck assembly. The button deck assembly is removably coupled to the housing and is configured to receive player input during play of the wagering game. The button deck assembly includes a frame sized to extend at least partially through the opening and into the cavity when the button deck assembly is coupled to the housing. The gaming machine further includes a connection assembly extending between the frame and the housing. The connection assembly includes a latch fixably mounted to one of the frame and the housing. The latch is configured to removably engage the other of the frame and the housing when the button deck assembly is coupled to the housing to secure the button deck assembly to the housing.

BRIEF DESCRIPTION OF THE DRAWINGS

An example embodiment of the subject matter disclosed will now be described with reference to the accompanying drawings.

DETAILED DESCRIPTION

The electronic gaming machine described herein may include a housing defining an internal cavity, and having an exterior surface that at least partially defines an opening in the housing such that the opening connects the outside of the housing to the internal cavity. The gaming machine may also include a button deck assembly configured to be removably coupled to the housing. The button deck being configured to receive player input during play of a wagering game. The button deck assembly may include a frame sized to extend at least partially through the opening and into the internal cavity of the housing. The gaming machine may also include a connection assembly extending between the frame of the button deck and the housing. The connection assembly having a latch fixably mounted to one of the frame and the housing, and configured to removably engage the other of the frame and the housing when the button deck assembly is coupled to the housing of the EGM to secure the button deck assembly to the housing of the EGM. Accordingly, embodiments of the electronic gaming machine described herein may facilitate detachably securing the button deck assembly to the housing of the EGM by hand operation (e.g.,, without requiring an operator to use tools to secure/detach the button deck assembly to the housing).

Figure 1:
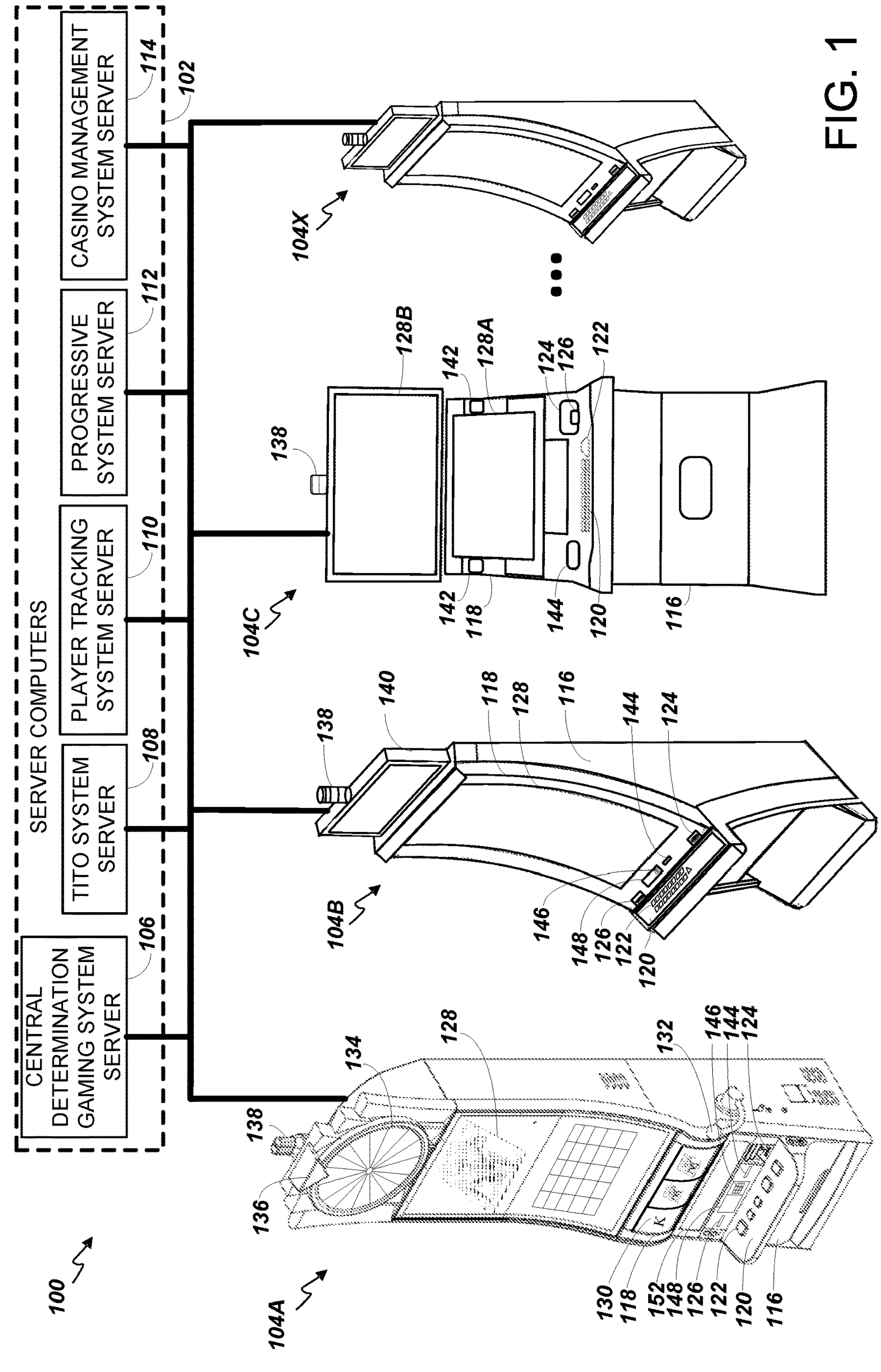
FIG. 1 is an exemplary diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XLTM model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2:
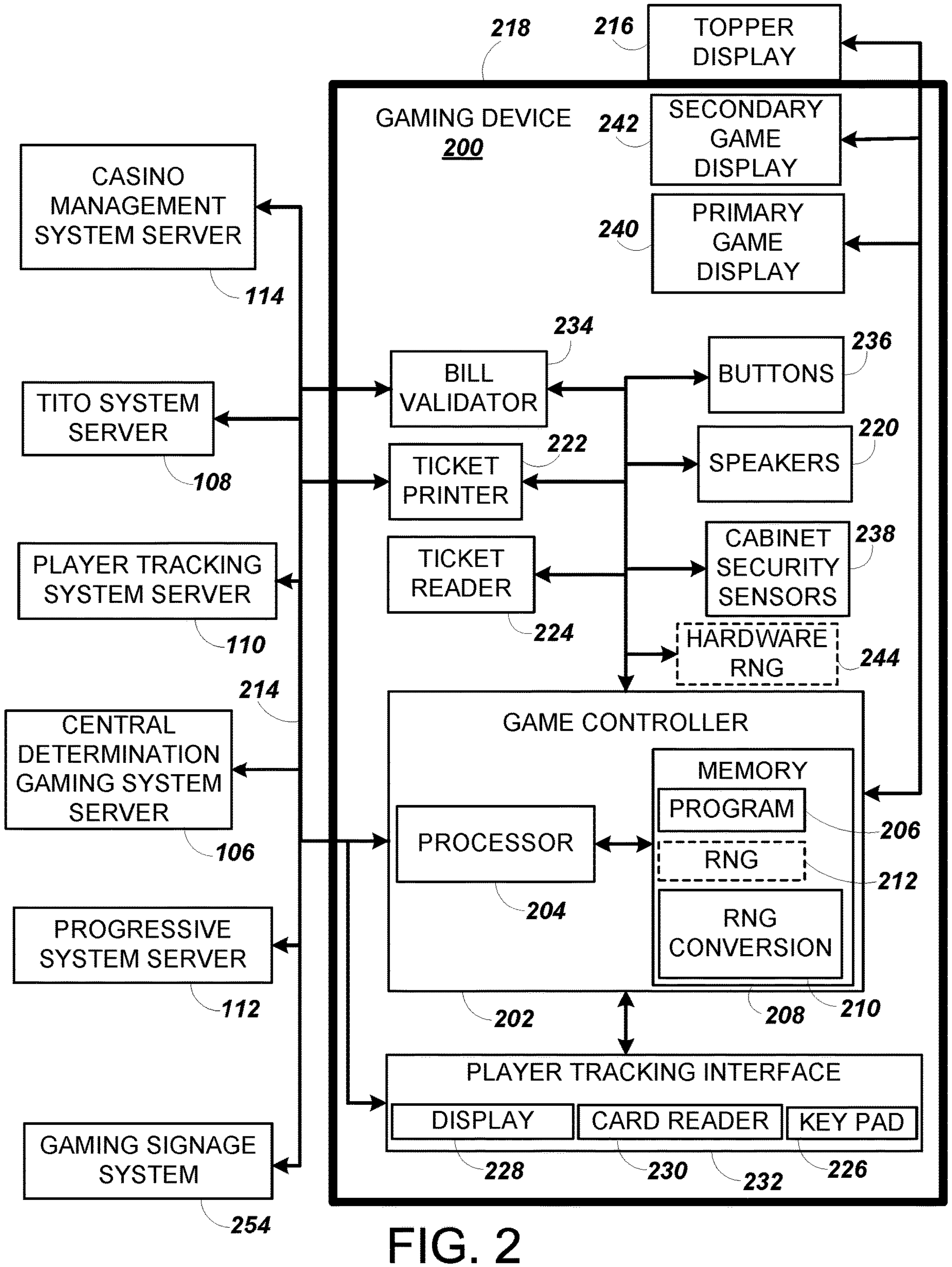
FIG. 2 is a block diagram showing various functional elements of an exemplary EGM.

Many or all the above described components can be controlled by circuitry (e.g., a game controller) housed inside the main cabinet 116 of the gaming device 104A, the details of which are shown in FIG. 2.

An alternative example gaming device 104B illustrated in FIG. 1 is the ArcTM model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the HelixTM model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2 illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
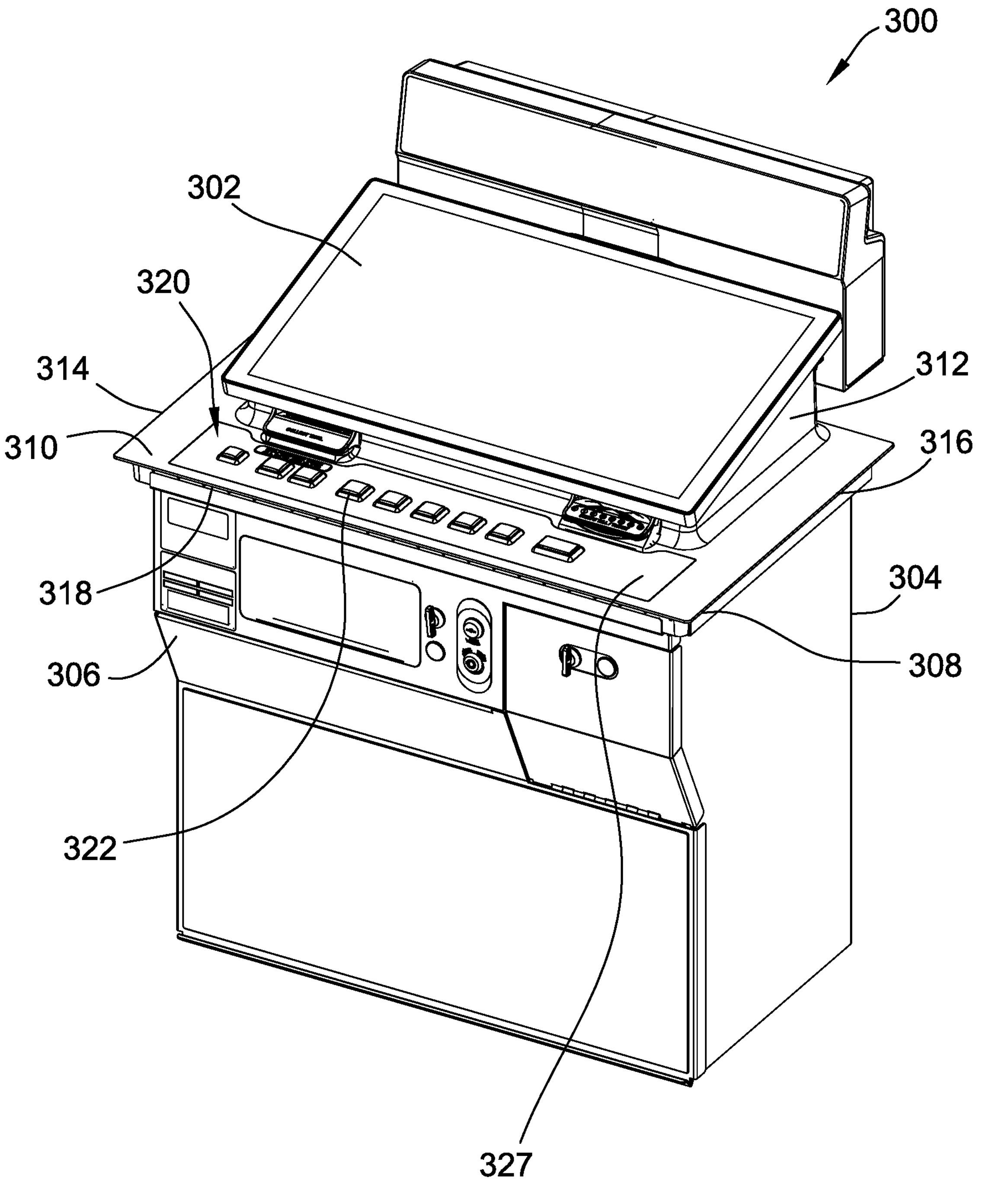
FIG. 3 is a perspective view of an exemplary gaming device, as shown in FIG. 1, including a button deck assembly and a main display in a closed position.
Figure 4:
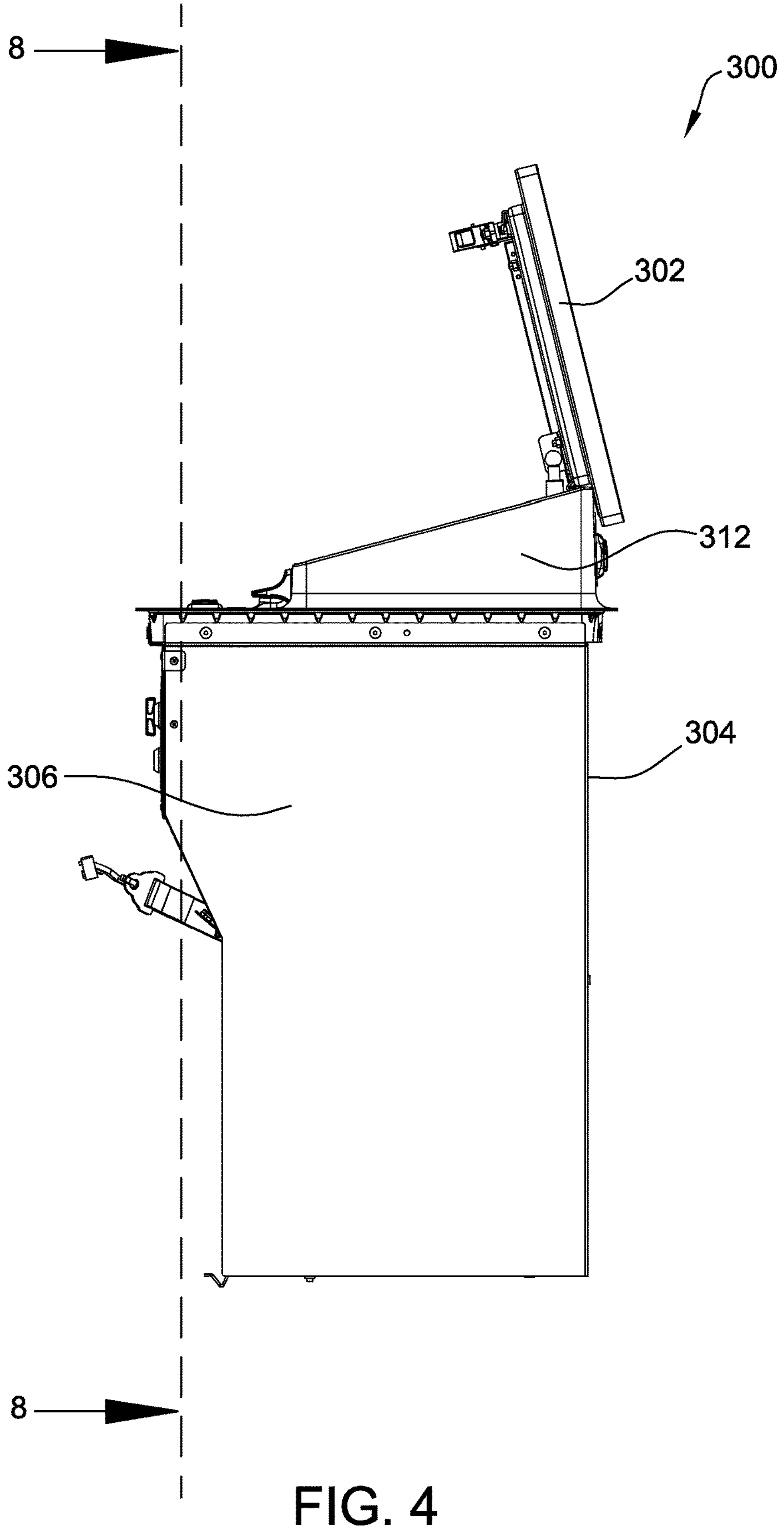
FIG. 4 is a side view of the gaming device shown in FIG. 3 with the main display 302 in an opened position.

FIG. 3 is a perspective view of an exemplary gaming device 300 including a main display 302 in a closed position. FIG. 4 is a side view of gaming device 300 shown in FIG. 3 with main display 302 in an opened position. In an exemplary embodiment, gaming device 300 is similar to EGM 104X (shown in FIG. 1). That is, gaming device 300 is a tabletop gaming machine and includes a housing 304 and a button deck assembly 320 removably coupled to housing. Housing 304 includes a cabinet 306 supporting a tabletop 308 having a table surface 310, or more broadly, an exterior surface of housing, and main display 302. Main display 302 is coupled to table surface 310 and oriented obliquely relative to table surface 310. More specifically, in an exemplary embodiment, main display 302 is coupled to table surface 310 via a display platform 312 extending from table surface 310. Display platform supports main display 302 at an oblique orientation relative to table surface 310. In an exemplary embodiment, main display 302 is rotatably coupled to display platform 312 and is configured to rotate between a closed position (shown in FIG. 3) and an open position (shown in FIG. 4). Referring to FIG. 4, when in the opened position, access to an internal cavity 340 (shown in FIG. 5) is permitted, thereby enabling servicing of various internal components (not shown) of gaming device 300 contained within cavity (340).

Referring back to FIG. 3, in an exemplary embodiment, tabletop 308 includes a first table edge 314 and a second table edge 316 extending in parallel to first table edge 314. A third table edge 318 extends between first table edge 314 and second table edge 316. In an exemplary embodiment a button deck assembly 320 is coupled to tabletop 308 between main display 302 and third table edge 318. More specifically, as described in greater detail below, button deck assembly 320 is removably coupled to housing 304. In some embodiments, button deck assembly 320 may be similar to button deck 120 (shown in FIG. 1), and may be installed within an EGM such as gaming devices 104A-104X. In an exemplary embodiment, button deck assembly 320 includes a plurality of dynamically configurable, mechanical pushbuttons 322 (similar to or the same as buttons 122, shown in FIG. 1 on button deck 120).

In an exemplary embodiment, button deck assembly 320 is configured to be lifted out of cabinet 306 and above table surface 310 to selectively decouple button deck assembly 320 from housing 304. In particular, button deck assembly 320 and housing 304 are sized in correspondence with one another such that a cover plate 327 of button deck assembly 320 rests flush in alignment with table surface 310 when button deck assembly 320 is coupled to housing 304.

Figure 5:
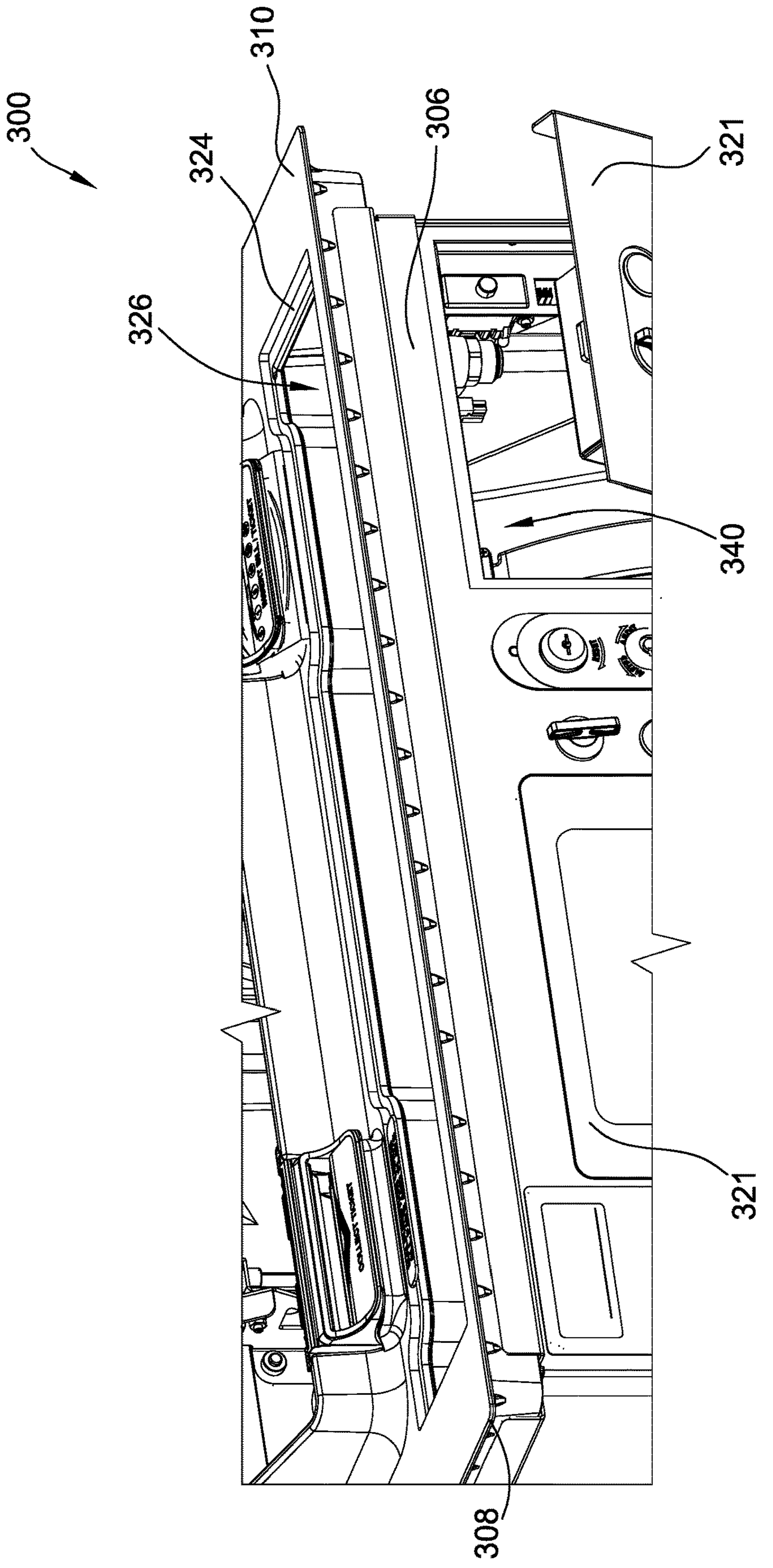
FIG. 5 is a perspective of the gaming device shown in in FIG. 3 with the button deck assembly removed from a housing of the gaming device.

FIG. 5 is a perspective of gaming device 300 shown in in FIG. 3 with button deck assembly 320 (shown in FIG. 3) removed from tabletop 308. In an exemplary embodiment, cabinet 306 defines internal cavity 340, which is sized to contain internal components of gaming device 300 therein. Cabinet 306 includes access doors 321 for allowing an operator to access cavity 340 (e.g., during servicing of gaming device 300).

In an exemplary embodiment, tabletop 308 includes a ledge 324 recessed from table surface 310 and defining a table opening 326 within tabletop 308 sized to receive button deck assembly 320 (shown in FIG. 3) therein. Ledge 324 is configured to support button deck assembly 320 (shown in FIG. 3) when button deck assembly 320 is received within table opening 326. Ledge 324 is recessed a sufficient height from table surface 310 such that cover plate 327 of button deck assembly 320 rests flush (i.e., is positioned in alignment) with table surface 310 when button deck assembly 320 is coupled to housing (shown in FIG. 3).

Figure 6:
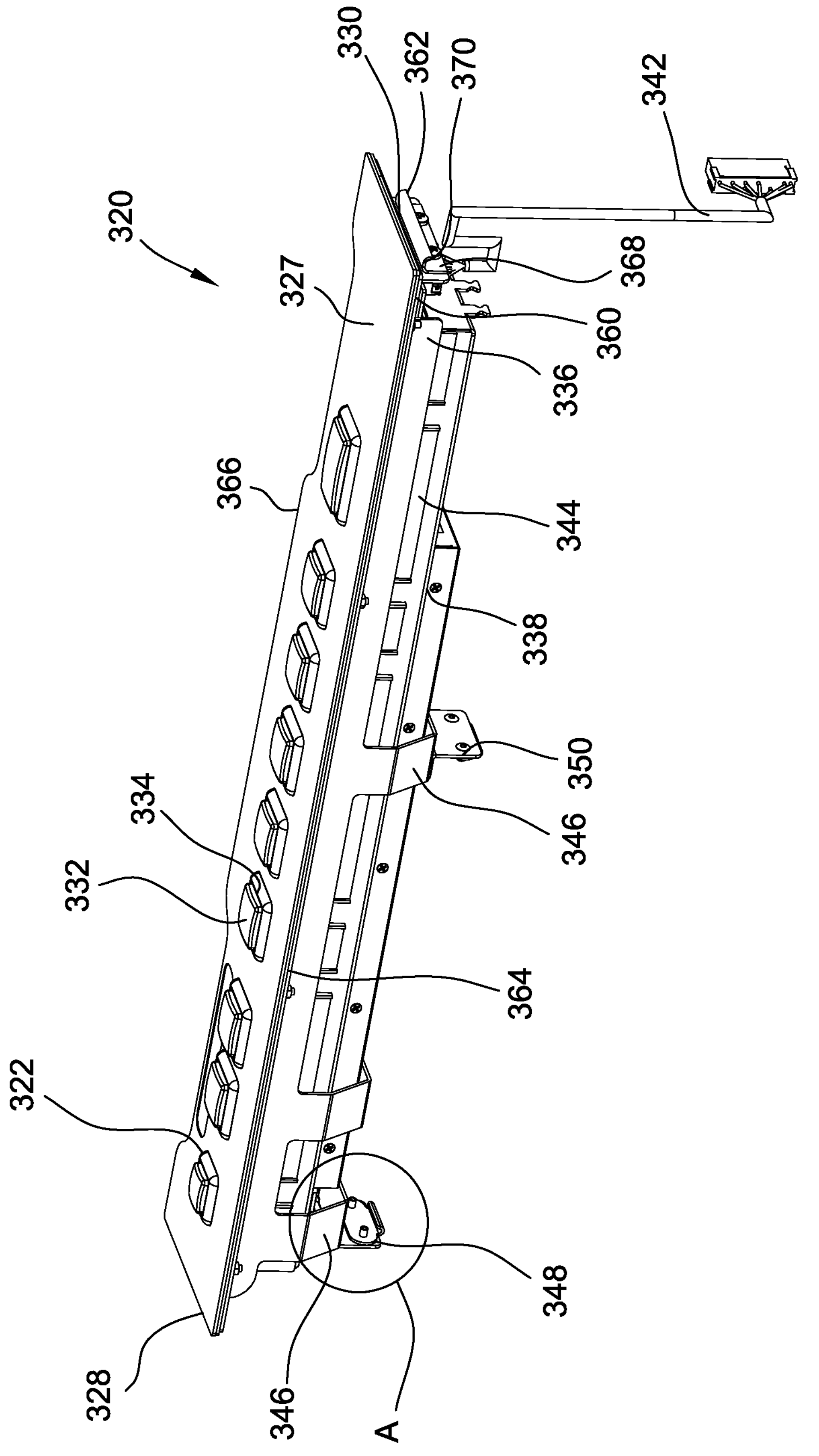
FIG. 6 is a perspective view of a button deck assembly for use in the gaming device shown in FIG. 3.
Figure 7:
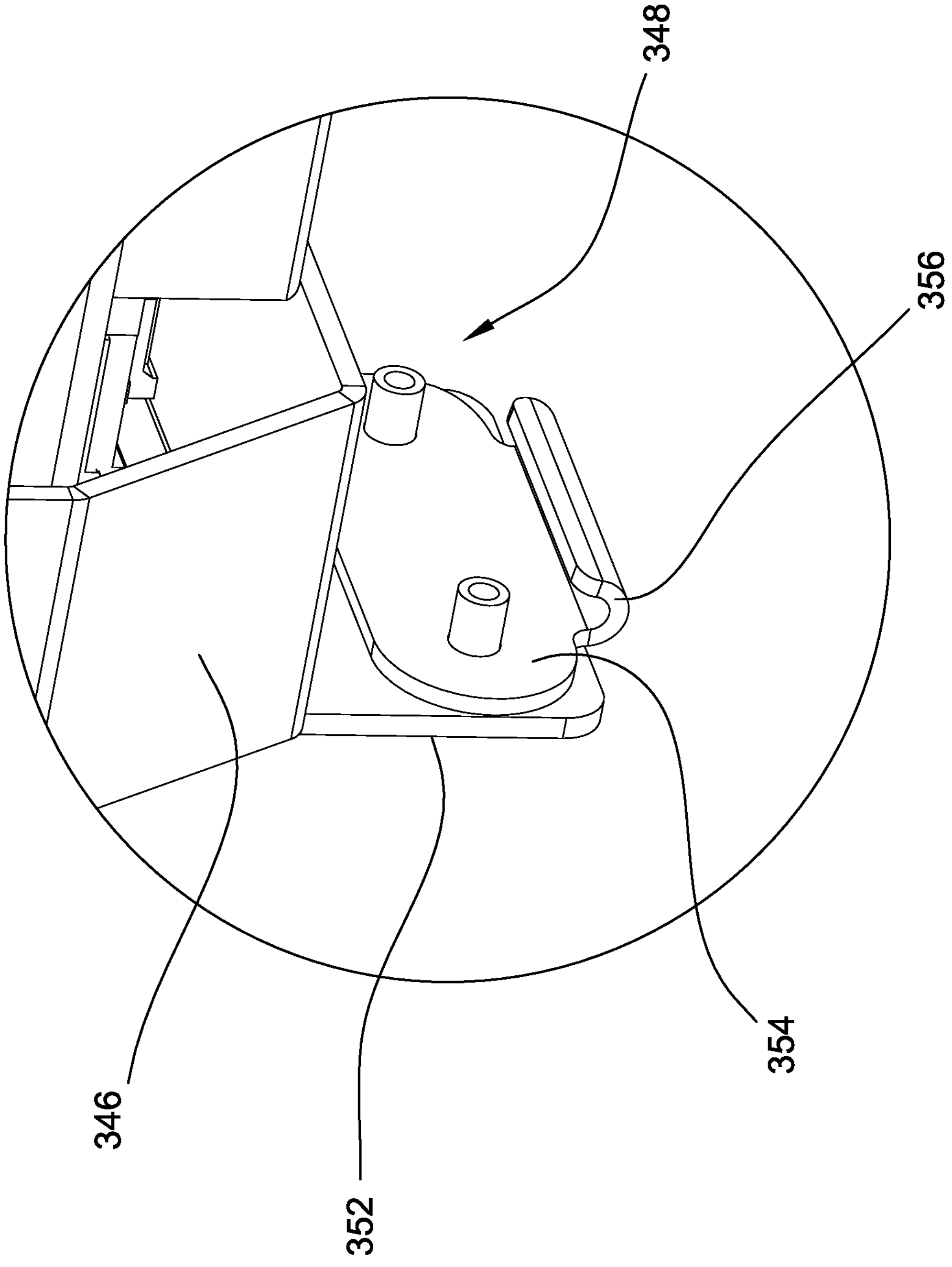
FIG. 7 is an enlarged view of the button deck assembly shown in FIG. 6 taken from region A, as shown in FIG. 6.

FIG. 6 is a perspective view of button deck assembly 320 shown in FIG. 5. FIG. 7 is an enlarged view of button deck assembly 320 taken from region A, as shown in FIG. 6. In an exemplary embodiment, button deck assembly 320 extends longitudinally between a first end 328 and a second end 330. Pushbuttons 322 are longitudinally spaced from one another between first end 328 and second end 330. Each pushbutton includes a lens cap 332 and a button bezel 334. In some embodiments, button deck assembly 320 may utilize a liquid crystal display (LCD) panel (not shown) to produce sharp images and/or visual impressions that are visible through pushbuttons 322, and that may be configured or dynamically reconfigured for operational needs (e.g., to support particular games, to switch between different types of games). In other embodiments, button deck assembly 320 may utilize other flat panel display technology in lieu of an LCD panel, such as organic light-emitting diode (OLED)

technology. Button deck assembly 320 may include any suitable number of pushbuttons 322 of varying size, shape, and/or structure. Additionally or alternatively, pushbuttons 322 may be spaced apart in any suitable configuration.

Dynamic mechanical pushbuttons 322 may have practically any appearance desired depending on the electronic configuration of the player interface by game controller 202 (shown in FIG. 2). In some embodiments, player tracking system server 110 (shown in FIG. 1) may transmit messages and/or display attract mode sequences to pushbuttons 322 to change the appearance of pushbuttons 322. Some EGMs are configured to switch from presenting one type of wagering game, such as, for example, slot games, to another type of wagering game, such as, for example, video poker games. For example, pushbuttons configured to display prompts associated with video poker games may be electronically reconfigured to display prompts associated with slot games. In other words, a pushbutton that may display a "spin" label in one type of game may be able to display a "bet" label for a different type of game. As such, the same button deck assembly can facilitate presentation and play of multiple and different wagering games on the same EGM.

In an exemplary embodiment, button deck assembly 320 includes a deck frame 336 and a carriage 338 coupled to cover plate 327. Deck frame 336 and carriage 338 depend from cover plate 327 and are configured to extend into cavity 340 of cabinet 306 when button deck assembly 320 is coupled to housing 304 (shown in FIG. 3). Carriage 338 is configured to contain sensitive electronics therein, such as a printed circuit board assembly (not shown). A wiring harness 342 enables electrical communication between the sensitive electronics contained within carriage 338 and additional computing devices (not shown) of gaming device 300 (e.g., computing devices positioned within cabinet cavity 340). In an exemplary embodiment, an elastomeric membrane 344 protects the sensitive electronics from outside contaminating substances (e.g., drink spills). In an exemplary embodiment, membrane 344 is a water-resistant elastomeric membrane, such as, for example, a silicone membrane, that routes liquid flow around and past sensitive internal electronics, thereby maintaining a separation between the liquid and the protected components. In other embodiments, carriage 338 may not include membrane 344.

In an exemplary embodiment, deck frame 336 includes a plurality of ribs 346 extending peripherally around carriage 338. A first keeper 348 and a second keeper 350 are coupled to ribs 346 and depend away therefrom to define a lower extent of button deck assembly 320. As described in greater detail below, keepers 348, 350 are configured to removably engage corresponding latches (shown in FIG. 8) coupled to cabinet 306 to secure button deck assembly 320 to housing 304.

Referring to FIG. 7, in an exemplary embodiment, first keeper 348 includes an arm 352 coupled to a corresponding rib 346 and depending therefrom. An engagement plate 354 is coupled to arm 352 and includes a hook 356 for engaging a hook of a corresponding latch (shown in FIG. 9). In an exemplary embodiment, button deck assembly 320 includes three ribs 346 and two keepers 348, 350 coupled to the outermost ribs. In other embodiments, button deck assembly 320 may include any suitable number of ribs 346 that enable button deck assembly 320 to function as described herein.

Referring back to FIG. 6, in an exemplary embodiment, keepers 348, 350 are oriented to face one another. In other words, keepers 348, 350 are oriented such that first keeper 348 located proximate first end 328 is oriented to face second end 330 and second keeper 350 located proximate second end 330 is oriented to face first end 328. In other embodiments, keepers 348, 350 may be arranged on deck frame 336 in any manner that enables button deck assembly 320 to function as described herein.

In an exemplary embodiment, button deck assembly 320 includes a seal 360 coupled to deck frame 336. Seal 360 is formed of a resiliently compressible material configured to prevent contaminating substances (e.g., a spilled drink) on table surface 310 from entering cabinet cavity (shown in FIG. 5). More specifically, in an exemplary embodiment, seal 360 is an electrically conductive elastomer. In other embodiments, seal 360 may be formed of any material that enables button deck assembly 320 to function as described herein. In an exemplary embodiment, seal 360 is sized to extend around a perimeter of deck frame 336.

In an exemplary embodiment, a biasing wedge 362 is coupled to deck frame 336 adjacent second end 330 and extends at least a part of the length of second end between a front side 364 and rear side 366 of button deck assembly 320. Biasing wedge 362 includes a fastening portion 368 for securing biasing wedge 362 to deck frame 336 and an arched portion 370 configured for resilient displacement towards fastening portion 368. In other embodiments, button deck assembly 320 may include a biasing wedge on any side and/or end of button deck assembly 320. Moreover, in some embodiments, button deck assembly 320 includes a plurality of biasing wedges 362 spaced along the length of second end 330.

Figure 8:
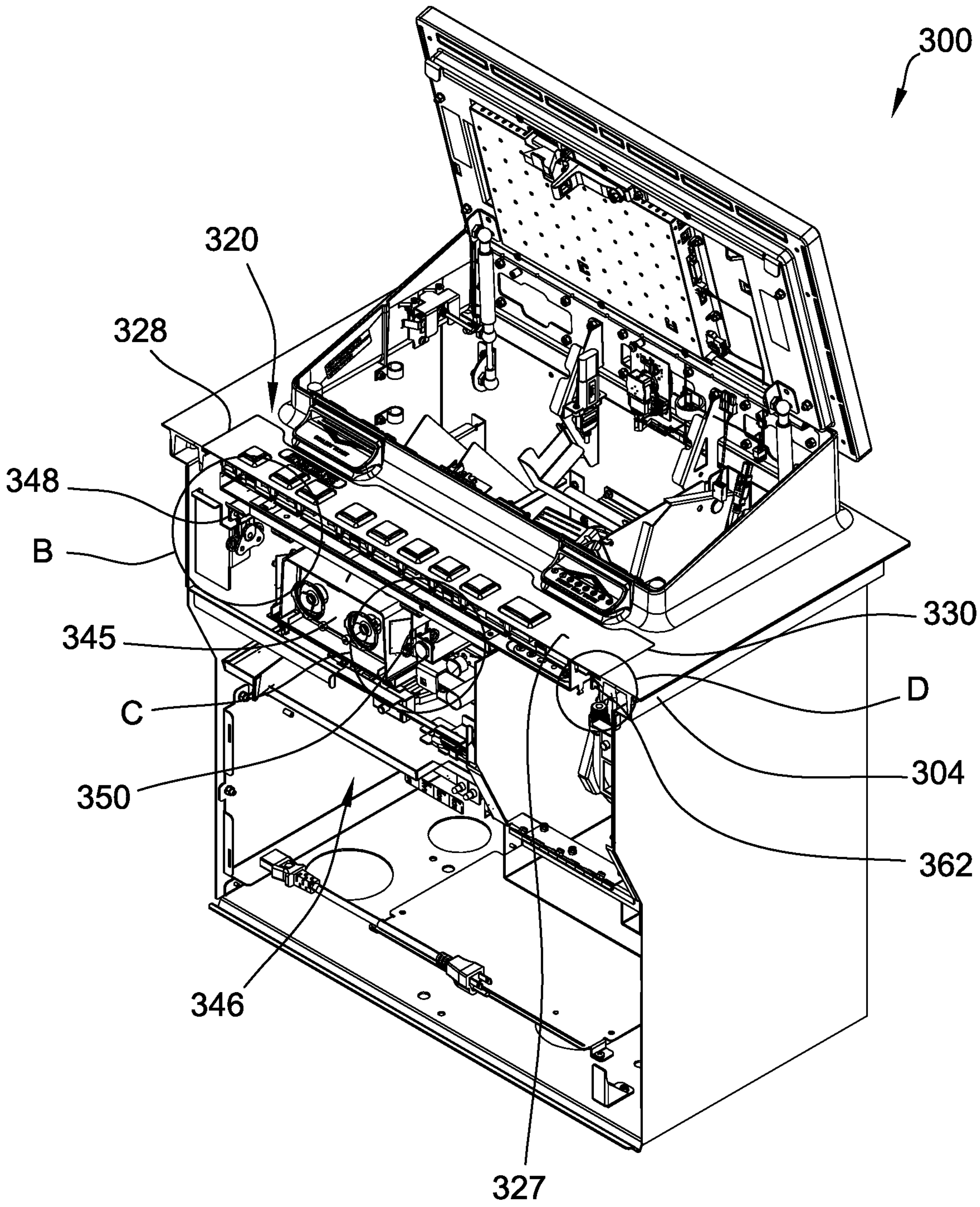
FIG. 8 is a sectional view of the gaming device shown in FIG. 4 taken across line 8-8, as shown in FIG. 4.

FIG. 8 is a sectional view of gaming device 300 shown in FIG. 4 taken across line 7-7, as shown in FIG. 4. In an exemplary embodiment, button deck assembly 320 is secured to housing 304 at three engagement points along the length of button deck assembly 320. More specifically, at a first engagement point, generally identified by the region B, first keeper 348 secures button deck assembly 320 to housing 304 proximate first end 328 of button deck assembly 320. At a second engagement point, generally identified by the region C, second keeper 350 secures button deck assembly 320 to housing 304 at approximately midway between first end 328 and second end 330. At a third engagement point, generally identified by the region D, biasing wedge 362 secures button deck assembly 320 to housing 304 proximate second end 330 of button deck assembly 320.

In an exemplary embodiment, housing 304 applies a downward force (i.e., in direction of cabinet cavity 340) on button deck assembly 320 at each of the engagement points. At least in part due to the downward force applied on button deck assembly 320 at each of the engagement points, cover plate 327 rests flush with table surface 310. In other embodiments, button deck assembly 320 is secured to housing 304 via any number of engagement points that enable gaming device 300 to function as described herein. For example, in some embodiments, button deck assembly may include a third keeper (not shown) proximate second end 330 configured to engage a corresponding latch (not shown) of housing 304.

In an exemplary embodiment, a speaker 345 is secured within cabinet cavity 340 via a keeper (not shown) fixedly attached to speaker 345 and corresponding latch (not shown) fixedly coupled to housing 304. In some embodiments, when decoupling button deck assembly 320 from housing 304, it may be first necessary for an operator to remove speaker 345 from housing 304.

Figure 9:
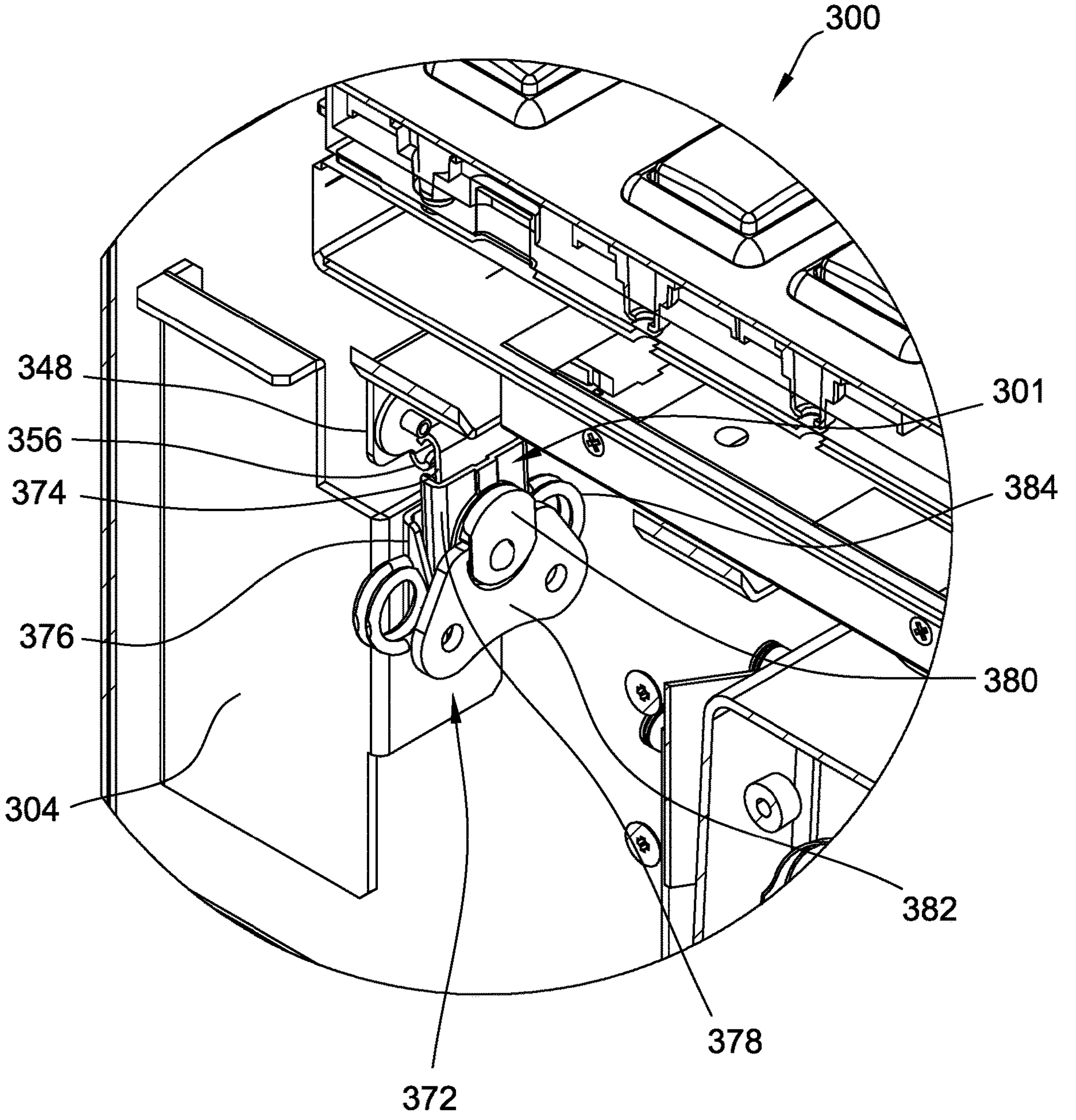
FIG. 9 is an enlarged view of the gaming device and latch shown in FIG. 8 taken from the region B, as shown in FIG. 8.

FIG. 9 is an enlarged view of gaming device 300 taken from region B, as shown in FIG. 8. In an exemplary embodiment, gaming device 300 includes a connection assembly 301. In particular, connection assembly 301 includes first keeper 348 and first latch 372. First keeper 348 is attached to housing 304 via engagement with a first latch 372. First latch 372 is moveable between a retracted position (shown in FIG. 9) and an extended position (shown in FIG. 14). First latch 372 engages first keeper 348 when first latch 372 is moved to the retracted position (e.g., by an operator servicing button deck assembly 320). More specifically, in an exemplary embodiment, first latch 372 includes a latch hook 374 configured to engage first hook 356 of first keeper 348 when button deck assembly 320 is coupled to housing and first latch 372 is moved to the retracted position.

In an exemplary embodiment, first latch 372 includes a bracket 376, a track frame 378, a cam assembly 380, a handle 382, and a biasing member 384. Bracket 376 is fixedly coupled to housing 304 at a predetermined location such that, when button deck assembly 320 is seated on ledge 324 of tabletop 308 (shown in FIG. 5), latch hook 374 may extend beyond first keeper hook 356 in the extended position. First latch 372 may then be adjusted to the retracted position, as shown, wherein first latch hook 374 engages first keeper hook 356 and applies a downward force on first keeper hook 356 of button deck assembly 320.

In an exemplary embodiment, hook 374 is at least partially received within track frame 378 and is moveable relative thereto via cam assembly 380 between the extended position and the retracted position. In particular, first latch 372 is a rotary draw latch configured to translate rotational movement of handle 382 into linear movement of hook 374 relative to track frame 378. In an exemplary embodiment, handle 382 is coupled to cam assembly 380 and is pivotable transversely outwards therefrom between a locked position (shown in FIG. 9), in which linear movement of hook 374 relative to track frame 378 is inhibited, and an unlocked position (shown in FIG. 14). In the unlocked position, rotation of handle 382 about track frame 378 drives rotation of cam assembly 380. Moreover, rotation of cam assembly 380 drives linear movement of hook 374 relative to track frame 378.

In an exemplary embodiment, biasing member 384 is configured to allow minor deflection of hook 374 against a biasing force of biasing member 384 to facilitate dampening of external forces applied on button deck assembly 320 when first latch 372 is coupled to first keeper 348. More specifically, track frame 378 is at least partially received within bracket 376 and biasing member 384 secures track frame 378 to bracket 376. Hook 374 is coupled to track frame 378 and is configured for translational movement therewith relative to bracket 376.

In an exemplary embodiment, when first latch 372 is locked in the retracted position, a compressive force of biasing member 384 biases hook 374 vertically downwards (i.e., away from button deck assembly 320). At least in part due to the coupling between hook 374 and biasing member 384, first latch 372 is configured to facilitate deflection of track frame 378 (and hook 374 therewith) vertically upwards (i.e., towards button deck assembly 320) against the compressive force of biasing member 384 while maintaining downward force on first keeper 348. Thus, biasing member 384 enables first latch 372 to dampen external forces applied on button deck assembly 320 when button deck assembly 320 is coupled to housing 304 while maintaining cover plate 327 in close flush alignment with table surface 310 (shown in FIG. 8). In an exemplary embodiment, biasing member 384 is a dual coil spring, with each coil coupled to hook 374 on opposing sides of hook. In other embodiments, first latch 372 may include any biasing member 384 that enables first latch 372 to operate as described herein. In further embodiments, first latch 372 does not include a biasing member.

Figure 10:
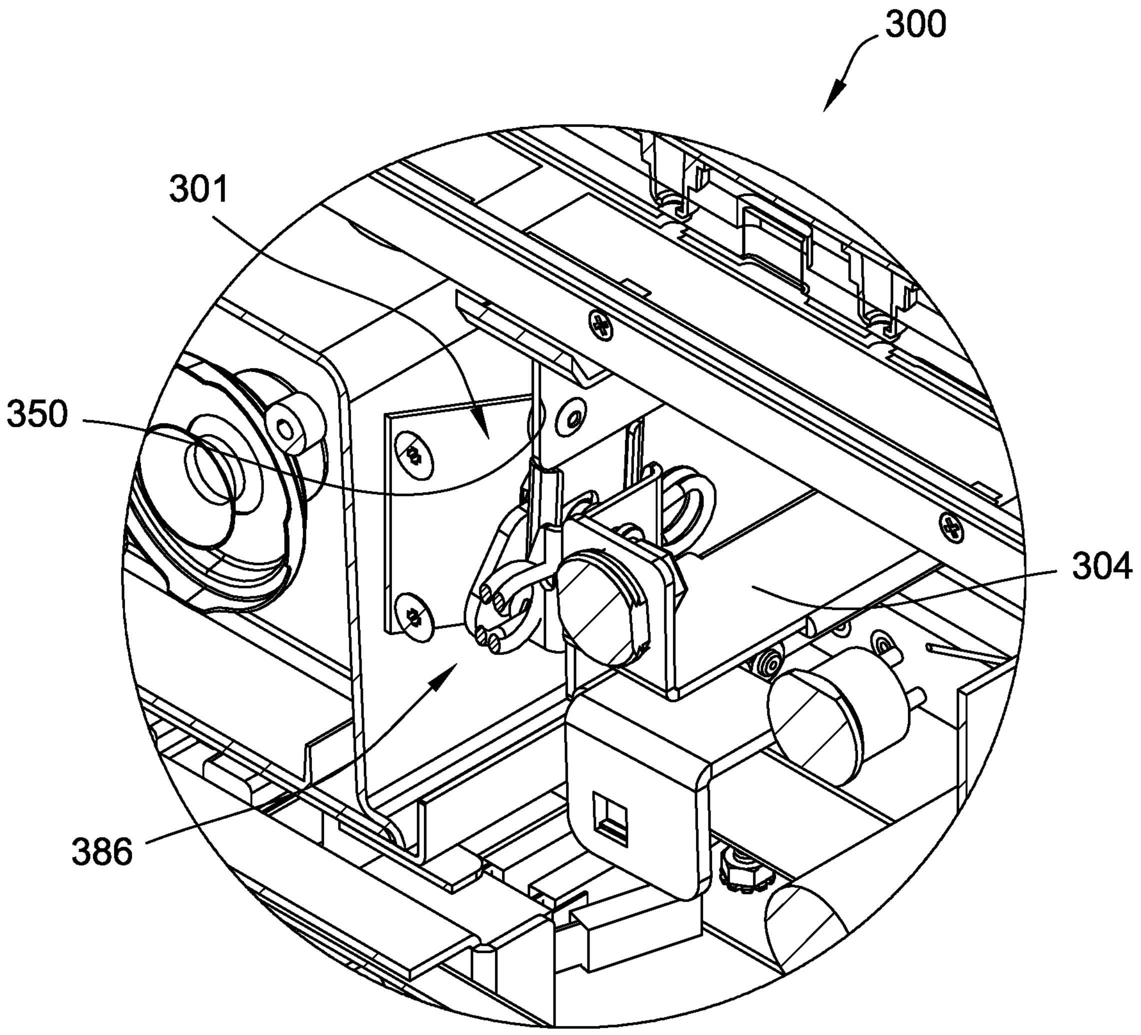
FIG. 10 is an enlarged view of the gaming device shown in FIG. 8 taken from the region C, as shown in FIG. 8.
Figure 14:
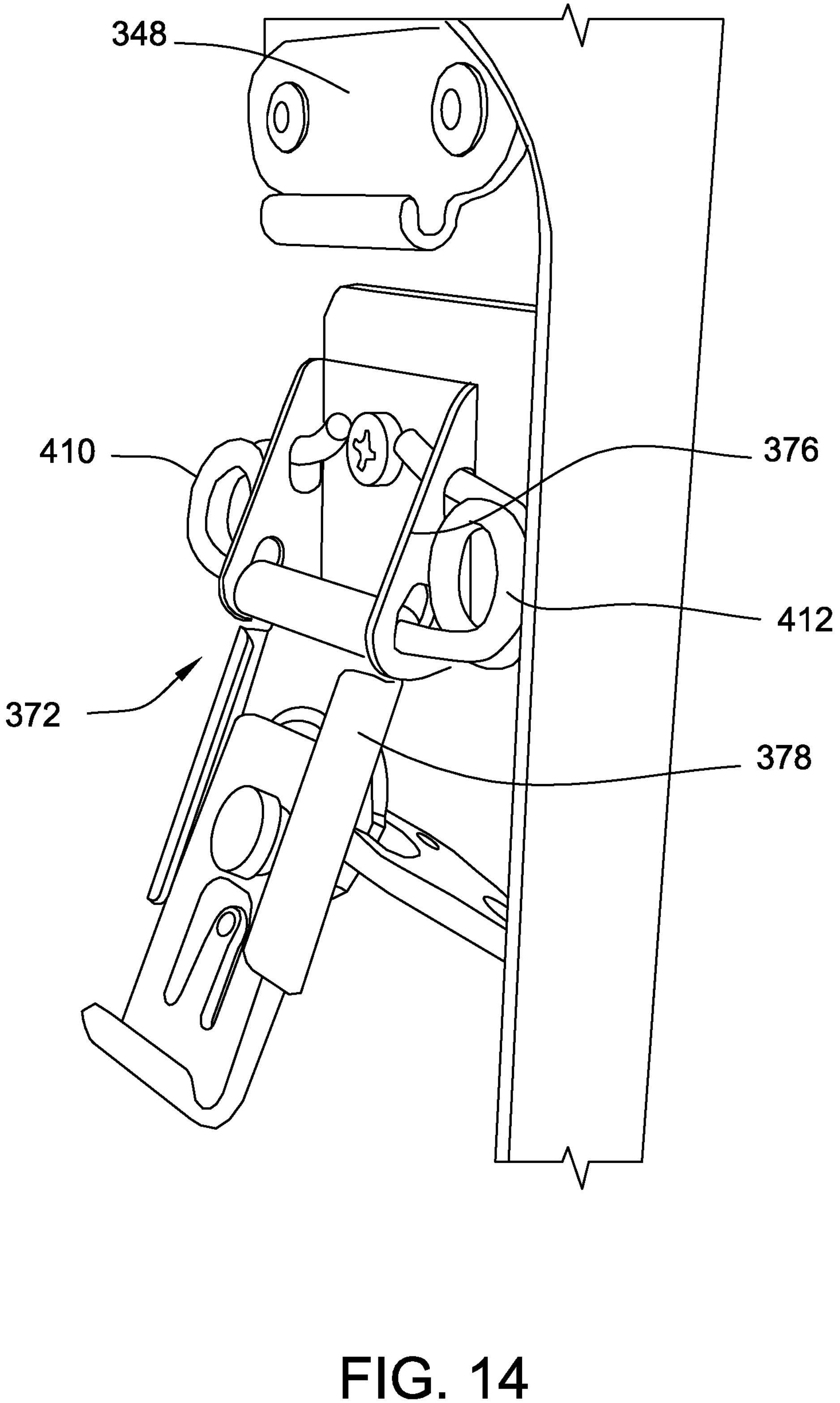
FIG. 14 is a perspective view of the latch shown in FIG. 9 in a lowered position.

FIG. 10 is an enlarged view of gaming device 300 taken from region C, as shown in FIG. 8. In an exemplary embodiment connection assembly 301 further includes second keeper 350 and second latch 386. Second keeper 350 is attached to housing 304 via engagement with a second latch 386. Second latch 386 is substantially the same as first latch 372 (shown in FIG. 9) and is configured to engage and secure second keeper 350 in substantially the same manner as described above with respect to FIG. 9. In particular, second latch 386 is shown in the retracted position and is moveable to an extended position (e.g., as shown in FIG. 14).

Figure 11:
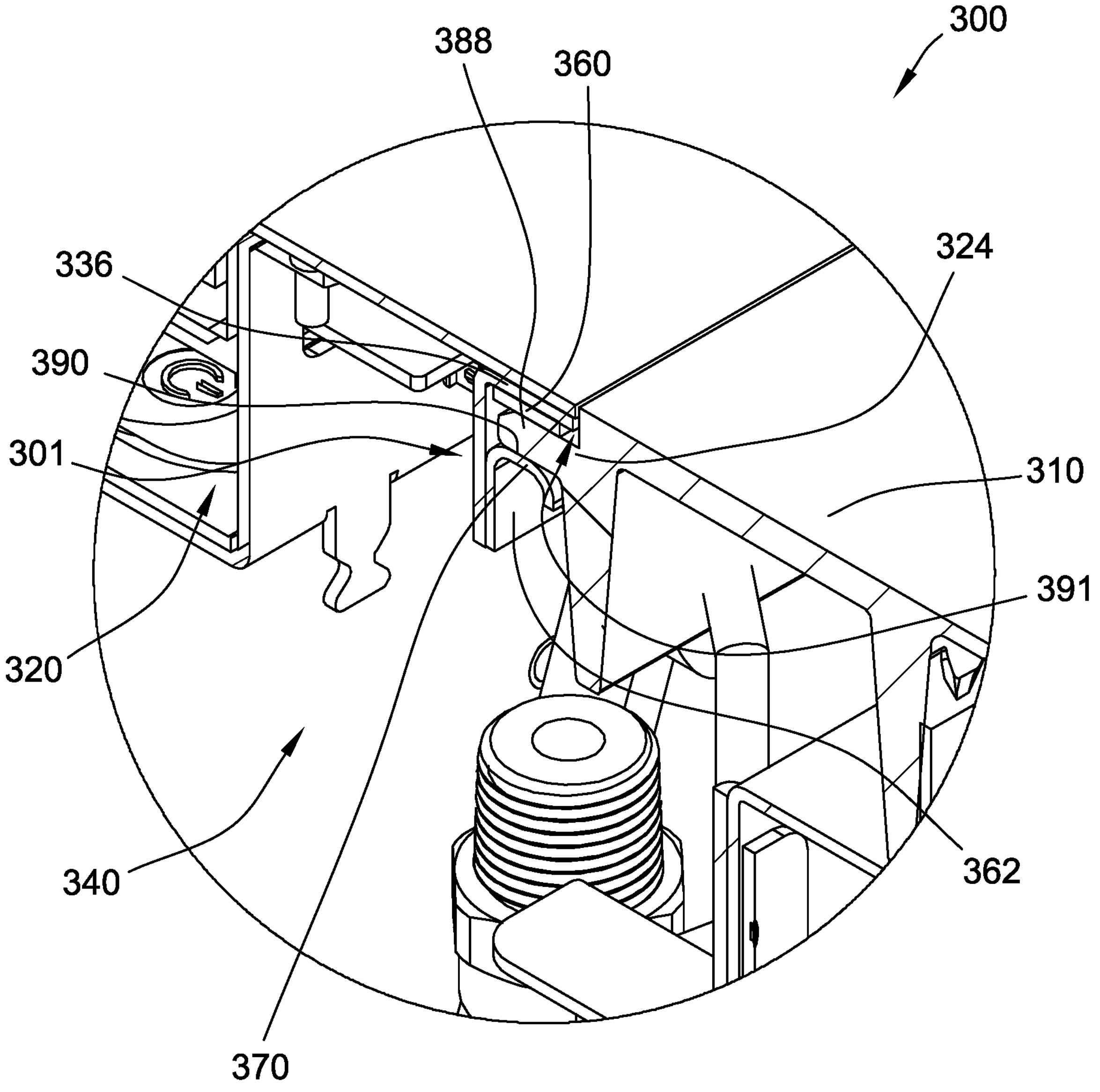
FIG. 11 is an enlarged view of the gaming device shown in FIG. 8 taken from the region D, as shown in FIG. 8.

FIG. 11 is an enlarged view of gaming device 300 taken from region D, as shown in FIG. 8. As shown in an exemplary embodiment, ledge 324 of tabletop 308 includes a first surface 388 facing outwards of cabinet cavity 340 and an opposed second surface 390 facing inwards to towards cabinet cavity 340. In an exemplary embodiment, ledge 324 is recessed a sufficient distance from table surface 310 such that deck frame 336 and seal 360 of button deck assembly 320 may be supported on first surface 388 of ledge 324 with cover plate 327 in flush alignment with table surface 310.

In an exemplary embodiment, seal 360 circumscribes button deck assembly 320 and is sized in correspondence with ledge 324. More specifically, seal 360 is configured to inhibit the flow of contaminating substances through a gap 391, indicated generally at 392, defined between button deck assembly 320 and tabletop 308, from entering cabinet cavity 340. More specifically, seal 360 is compressible to substantially fill all space between deck frame 336 and ledge 324. In other embodiments, seal 360 is sized to completely fill gap 391.

In an exemplary embodiment connection assembly 301 further includes biasing wedge 362. In an exemplary embodiment, arched portion 370 of biasing wedge 362 is sized to extend laterally from deck frame 336 and engage second surface 390 of ledge 324 when button deck assembly 320 is coupled to housing 304. In particular, biasing wedge 362 is configured to be deflected downward (i.e., in the direction of cabinet cavity 340) against a compressive force of biasing wedge 362 by ledge 324 through engagement between second surface 390 of ledge 324 and arched portion 370 when button deck assembly 320 is coupled to housing 304. Deflection of arched portion 370 against the compressive force of biasing wedge 362 applies a net downward force on button deck assembly 320, thereby compressing seal 360 between deck frame 336 and ledge 324 proximate second end 330 of button deck assembly 320. In other words, in an exemplary embodiment, biasing wedge 362 allows for compression of seal 360 between deck frame 336 and housing 304 adjacent second end 330 of button deck assembly 320 without requiring a latching mechanism similar to first latch 372 and second latch 386 described above with respect FIGS. 9 and 10. In other embodiments, button deck assembly 320 may include a third keeper (not shown) configured to engage a third latch (not shown) proximate second end 330 of button deck assembly 320.

Figure 12:
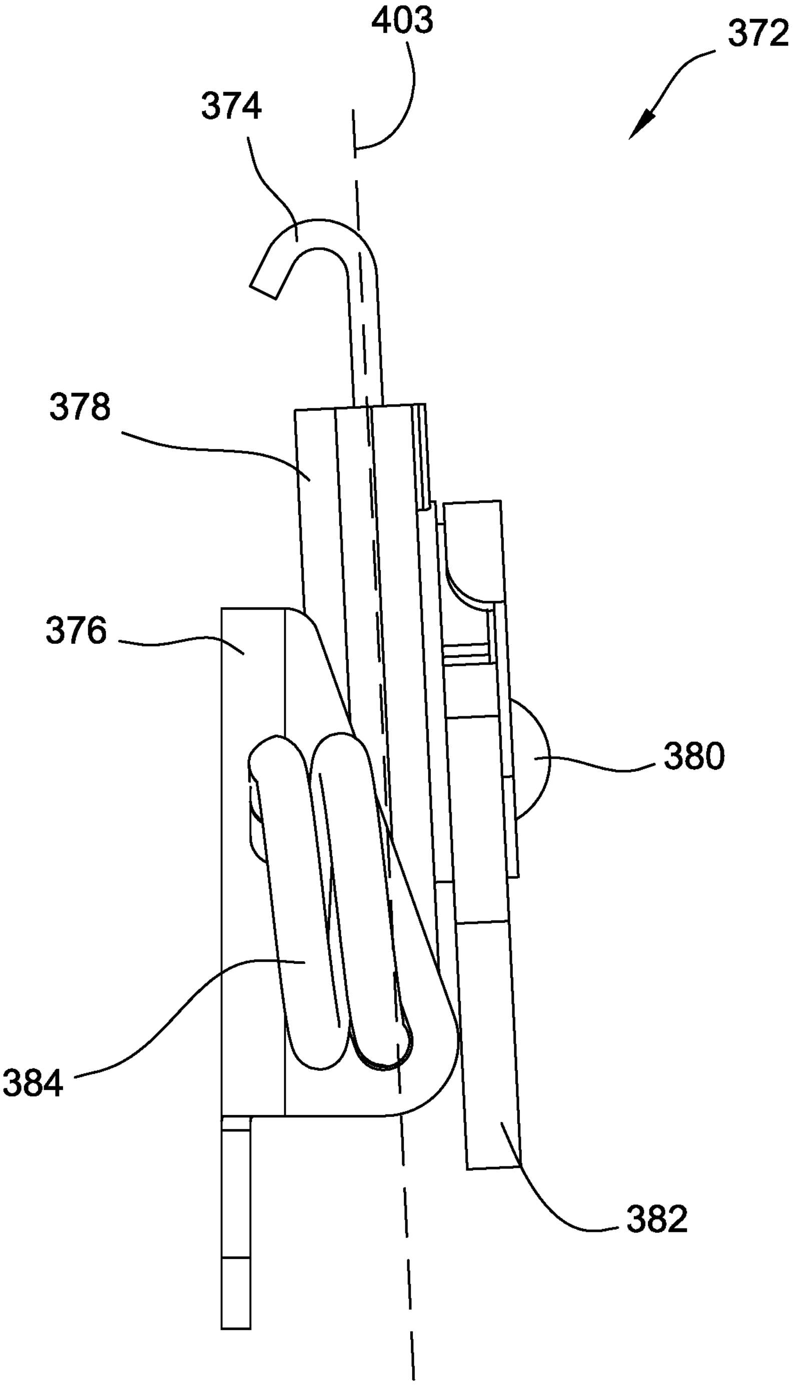
FIG. 12 is a side view of a latch for use with the gaming device shown in FIG. 8.
Figure 13:
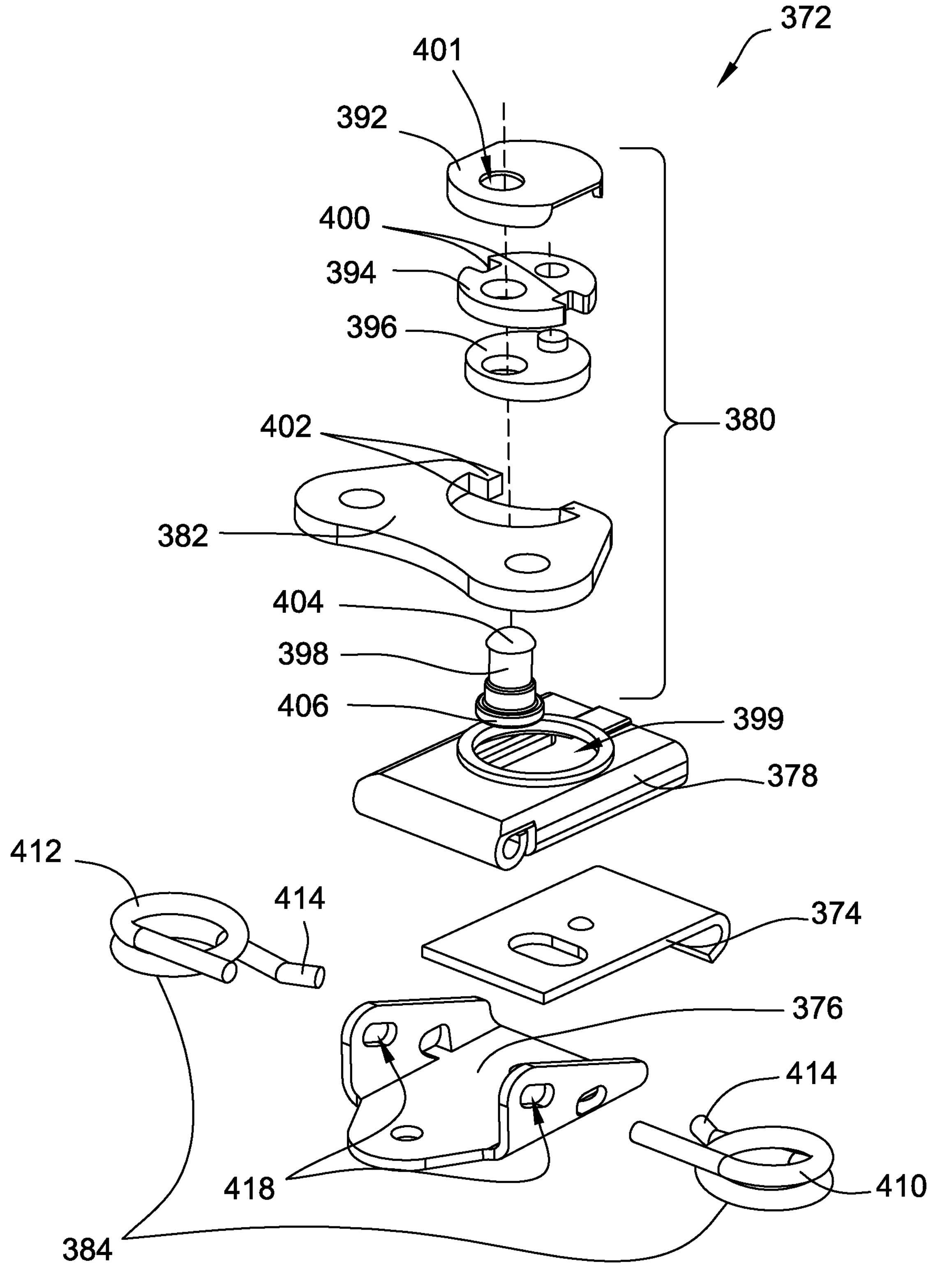
FIG. 13 is an exploded view of the latch shown in FIG. 12.

FIG. 12 is a side view of first latch 372 shown in FIG. 9. FIG. 13 is an exploded view of first latch 372 shown in FIG. 9. FIG. 14 is a perspective view of first latch 372 shown in FIG. 9 in a lowered position.

Referring to FIG. 13, in an exemplary embodiment, cam assembly 380 includes an outer cover 392, a first rotating plate 394, a second rotating plate 396, and a shaft 398 sized to end through aligned apertures 401 in outer cover 392, first rotating plate 394, and second rotating plate 396. Track frame 378 defines an aperture 399 sized to receive each of outer cover 392, first rotating plate 394, and second rotating plate 396, therein and to facilitate rotation of cam assembly 380 within track frame 378. First rotating plate 394 defines a pair of circumferentially opposed notches 400 sized to receive corresponding arms 402 of handle 382 and to facilitate pivoting handle 382 within notches 400 to move handle between the unlocked position and locked position.

In an exemplary embodiment, shaft 398 extends between a nub 404 and a disc 406. When assembled (e.g., as shown in FIG. 14), shaft 398 extends through an elliptical aperture 408 defined in hook 374 such that hook 374 is positioned between disc 406 and nub 404. During operation, when handle 382 is in the unlocked position, rotation of handle 382 drives rotation of cam assembly 380 within track assembly aperture 399. This in turn drives rotation of shaft 398 within aperture of hook 374. Due, at least in part, to the shape elliptical aperture defined within hook 374, circumferential rotation of shaft 398 within track frame aperture 399 drives longitudinal movement of hook 374 relative to track frame 378 to move hook 374 between the extended position and the retracted position.

In particular, referring to FIG. 12, hook 374 is shown in the retracted position. During operation, when handle 382 is rotated, hook extends linearly along an extension axis, indicated at 403. In an exemplary embodiment, turning handle 382 approximately 180 degrees moves hook 374 between the extended position and the retracted position.

Referring back to FIG. 13, in an exemplary embodiment, biasing member 384 includes a first spring coil 410 and a second spring coil 412 each extending between respective first ends 414 to respective second ends 416. First ends 414 of each coil 410, 412 are fixedly coupled to bracket 376. Second ends 416 each extend through a respective base slot 418 defined on opposed sides of bracket 376 and are sized to extend at least partially through a channel 420 defined in track frame 378. Base slots 418 are sized to allow movement of first spring coil 410 and second spring coil 412 therein to facilitate enabling deflection of track frame 378 relative to bracket 376 as described above.

Referring to FIG. 14, when assembled, first spring coil 410 and second spring coil 412 urge track frame 378 downwards. Moreover, track frame 378 is rotatable about first spring coil 410 and second spring coil 412 to facilitate rotating track frame 378 to a lowered position. As shown in an exemplary embodiment, after an operator has uncoupled first latch 372 from first keeper 348, the operator may rotate track frame 378 downwards relative to bracket 376 to prevent latch hook 374 from interfering with first keeper 348 when first keeper 348 is removed.

Figure 15:
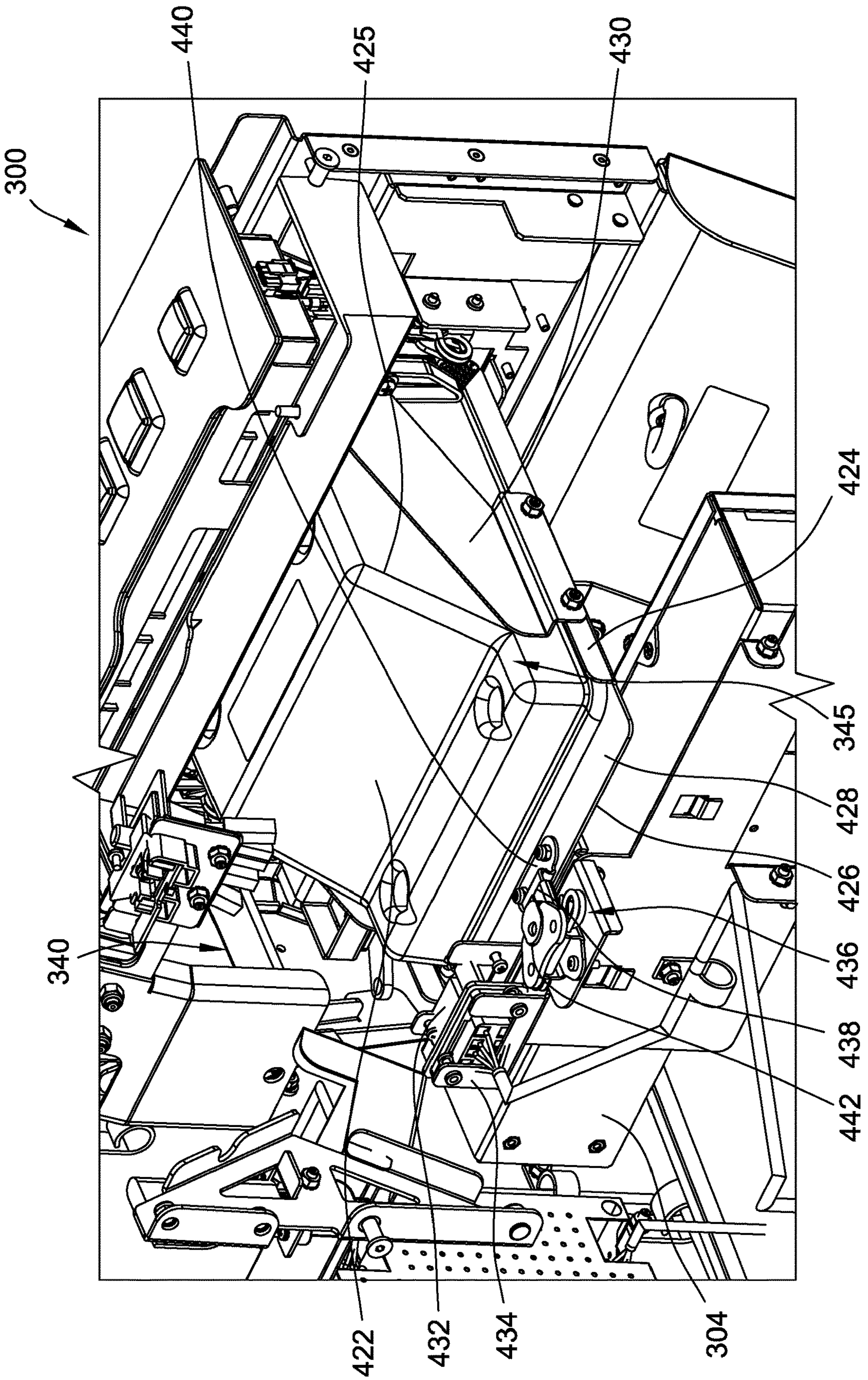
FIG. 15 is an enlarged perspective view of a portion of the gaming device shown in FIG. 4.

FIG. 15 is an enlarged perspective view of a portion of gaming device 300 shown in FIG. 4 with portions of gaming device 300 removed for clarity. More specifically, FIG. 15 shows a rear side 422 of speaker 345 viewed from within internal cavity 340 of gaming device 300. Speaker 345 is configured to be communicatively coupled to a game controller (e.g., similar game controller 200, shown in FIG. 2) of gaming device 300 and to output audio corresponding to a sequence of the game based on communications received from the game controller.

In an exemplary embodiment, speaker 345 includes a platform 424 supporting a speaker body 425. Platform 424 extends from a rear end 426 to a front end (now shown) positioned adjacent access door 321 (shown in FIG. 5). In an exemplary embodiment, platform 424 includes a floor 428 and an arm 430 coupled to floor 428 and extending obliquely therefrom to the front (not shown) of platform 424. In an exemplary embodiment, housing 304 of gaming device 300 includes a shelf (not shown) positioned beneath floor 428 and configured to support speaker 345 thereon. In alternative embodiments, speaker 345 may include any platform 424 that enables speaker to function as described herein. In yet further alternative embodiments, speaker 345 does not include a platform 424.

In an exemplary embodiment, speaker 345 is removably coupled to housing 304. In particular, speaker 345 is slidably received within internal cavity 340 of housing 304 by sliding engagement between floor 428 and the shelf (not shown) supporting floor 428. Speaker 345 further includes a first electrical connector 432 positioned near rear end 426 to electrically and communicatively couple speaker 345 to a corresponding second electrical connector 434 of gaming device 300 when speaker is slidably received within internal cavity 340. Second electrical connector 434 is configured to connect first electrical connector 432 to at least one of an external power source (not shown) and or game controller (not shown). In alternative embodiments, first electrical connector 432 and second electrical connector 434 may be positioned in any manner that enables speaker 345 to function as described herein.

In an exemplary embodiment, gaming device 300 includes an accessory connection assembly 436 extending between speaker 345 and housing 304 to secure speaker 345 to housing 304. Accessory connection assembly 436 includes a latch 438 fixably mounted to housing 304 and a keeper 440 fixably mounted to platform 424. More specifically, in an exemplary embodiment, keeper 440 is fixably mounted to floor 428 of platform 424 at rear end 426. In alternative embodiments, keeper 440 is mounted to speaker 345 in any manner that enables accessory connection assembly 436 to function as described herein. For example, and without limitation, in some alternative embodiments, keeper 440 is mounted to speaker 345 proximate the first end and latch 438 is positioned within housing 304 to engage keeper 440 at the first end. In yet further alternative embodiments, latch 438 is fixably mounted to platform 424 and keeper 440 is fixably mounted to housing 304.

In an exemplary embodiment, latch 438 is removably engaged with keeper 440 of speaker 345 to fixably secure speaker 345 in position within internal cavity 340 of housing 304. Latch 438 includes a handle 442 operable to move latch 438 between an extended position and a retracted position to facilitate removable engagement with keeper 440. In other words, in an exemplary embodiment, latch 438 is substantially the same as latch 372 described above with respect to FIGS. 9 and 12-14. Keeper 440 is substantially the same as keeper 348 described above with respect to FIGS. 6 and 7. In alternative embodiments, accessory connection assembly 436 may include any latch, keeper, or other similar coupling mechanism that enables accessory connection assembly 436 to function as described herein.

During operation, to remove speaker 345 from housing 304, an operator may open display 302 (e.g., as shown in FIG. 4) to expose internal cavity 340. Handle 442 of latch 438 may then be rotated to move latch 438 to the extended position and latch 438 may be rotated to disengage latch 438 from keeper 440. First electrical connector 432 and second electrical connector 434 may be decoupled from one another. Access door 321 (shown in FIG. 5) may be opened to enable operator to slide speaker 345 along the shelf (not shown) and out of housing 304. Speaker 345 may be installed and fixably secured to housing 304 in substantially the reverse order of these steps.

In alternative embodiments, gaming device 300 may include an accessory connection assembly, substantially similar to accessory connection assembly 436, removably securing any accessory of gaming device 300. For example, and without limitation, in some alternative embodiments, gaming device 300 includes an accessory connection assembly fixably securing at least one of game controller 292, topper display 216, ticket printer 222, ticket reader 224, keypad 226, player tracking display 228, card reader 230, bill validator 234, primary game display 240, and a secondary game display 242.

Figure 16:
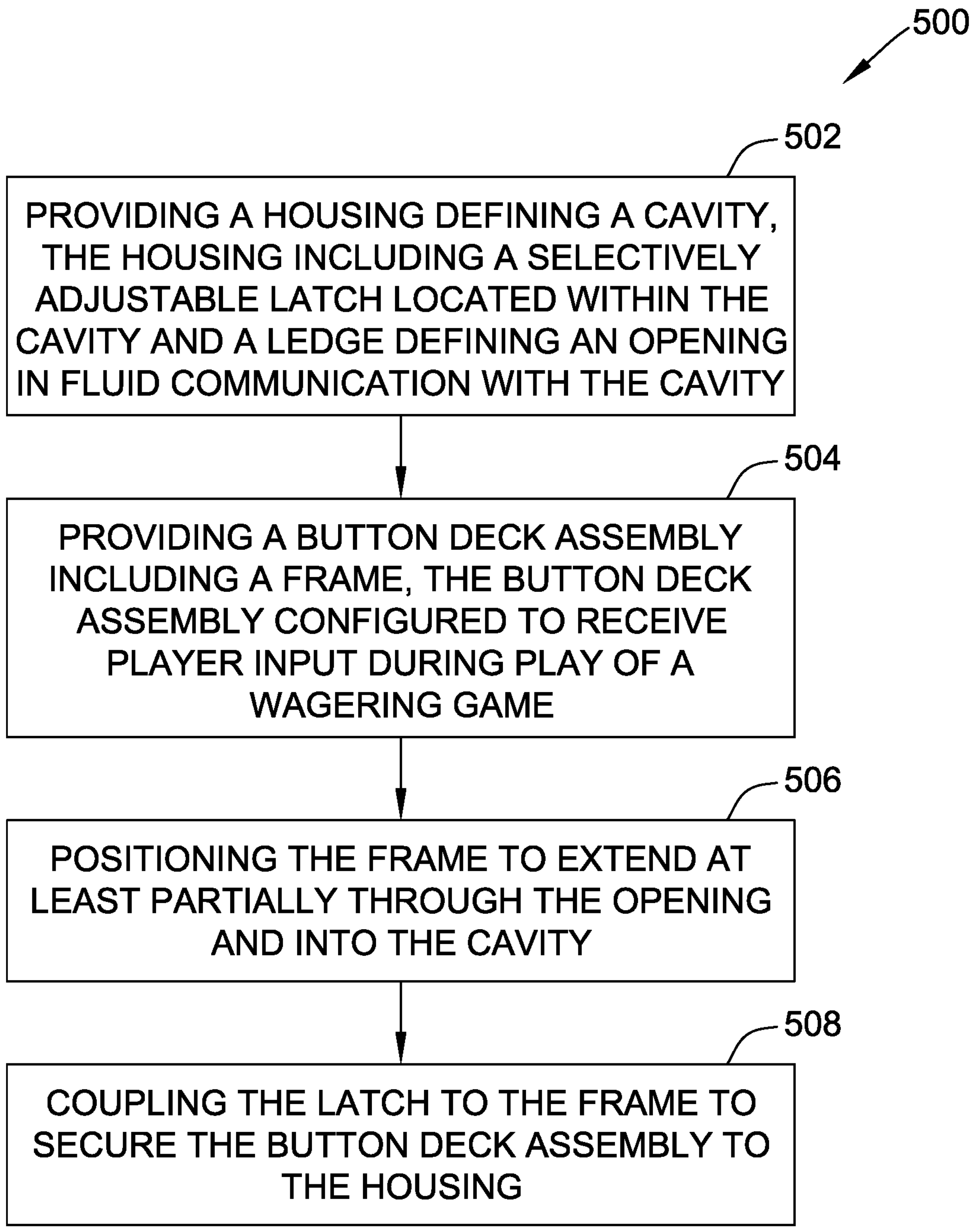
FIG. 16 is a flowchart illustrating an exemplary process for assembling the gaming device and button deck assembly shown in FIG. 3.

FIG. 16 is a flowchart illustrating an exemplary process 500 for assembling the gaming device 300 and button deck assembly 320 shown in FIG. 3. Accordingly, in an exemplary embodiment, housing 304 defining cavity 340 and including a selectively adjustable latch 372 located within the cavity 340 and a ledge 324 defining an opening 326 in fluid communication with the cavity 340, may be provided (step 502). Button deck assembly 320 including frame 336 and configured to receive player input during play of a wagering game, may also be provided (step 504).

In an exemplary process, frame 336 may be positioned to extend at least partially through opening 326 and into the cavity 340 (step 506). More specifically, referring to FIGS. 5 and 6, button deck assembly 320 may be oriented obliquely relative to ledge surface 324 such that second end 330 faces downward (i.e., towards opening 326) and first side is oriented away from opening 326. Second end 330 may then be inserted in opening 326 such that biasing wedge 362 (shown in FIG. 7) is located below ledge 324 and at least a portion of frame 336 is located above ledge 324. More specifically, second end 330 may be positioned such that biasing wedge 362 (shown in FIG. 7), engages second surface 390 of ledge 324. Button deck assembly 320 may then be rotated to bring second end 330 into lateral contact with tabletop 308. With biasing wedge 362 engaged with second surface 390, first end 328 of button deck assembly 320 may be lowered into lateral alignment with second end 330 such that frame 336 is seated on ledge 324 at both first and second ends 328, 330. Latch 372 may then be coupled to frame 336 to secure button deck assembly 320 to housing 304 (step 508). More specifically, first latch 372 and second latch 386 may then be respectively coupled to first keeper 348 and second keeper 350 in substantially the manner described above with respect to FIGS. 9 and 10. Button deck assembly 320 may be removed from housing 304 in substantially the reverse order of the steps described with respect to FIG. 15.

Exemplary technical effects of the methods, systems, and apparatus described herein include at least one of: (a) facilitating tool-less (i.e., hand operated) removal of button decks for servicing, installation, and/or removal; (b) improved ease of access for operators in small confines of an EGM; (c) reduced overall damage to button deck assemblies as compared with threaded fastener systems, at least some of such systems which may irrevocably damage button deck assemblies when, for example, excessive torque is applied to such fasteners; (d) reduced complexity in servicing, installation, and/or removal of button deck assemblies, facilitating a non-technical operator (e.g., a bartender) to perform emergency maintenance and "clean" a button deck without technician assistance; (e) reduced overall time required in servicing, installation, and/or removal of button deck assemblies as compared with at least some known threaded fastener systems; (f) reduced liquid ingress into the cabinet cavity through the compression of a gasket; (g) improved tamper prevention at least in part due to the mechanical strength of the draw latch being greater than the button deck plate which, in at least some cases, may fail when pried upon (e.g., by a someone attempting to break in to the EGM) prior to failure of the draw latch; (h) reduced operational failures of the electronic gaming machine resulting from, for example, accidental dropping of fasteners during servicing, installation, and/or removal of button decks using at least some known threaded fastener systems; (i) reduced replacement required for fastening system parts (e.g., as compared with the replacement of fasteners required in at least some known threaded fastener systems); (j) reduced complexity and number of parts that an operator needs to keep track of during servicing, installation, and/or removal of button decks as compared to at least some known threaded fastener systems.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device comprising:
- a housing defining an internal cavity, the housing comprising an exterior surface at least partially defining an opening extending through the housing and connecting with the internal cavity;
- a button deck assembly removably coupled to the housing and configured to receive a player input, the button deck assembly comprising:
  - a frame sized to extend at least partially through the opening of the housing and into the internal cavity when the button deck assembly is coupled to the housing, the frame extending laterally from a first end to an second end; and
  - a wedge coupled to the frame of the button deck assembly and extending laterally outward from the frame proximate the second end, the wedge comprising an arched portion positioned to engage the housing, and wherein engagement of the arched portion with the housing causes the arched portion to deflect towards the frame of the button deck assembly.

2. The gaming device of claim 1, wherein the housing comprises a ledge, the button deck assembly sized to be seated on the ledge when the button deck assembly is coupled to the housing, and wherein the arched portion is configured to engage the ledge.

3. The gaming device of claim 1, wherein the gaming device further comprises a connection assembly, the connection assembly including the wedge and a latch, wherein the latch is positioned proximate the first end of the frame.

4. The gaming device of claim 3, wherein the latch is coupled to the housing proximate the first end of the frame, the connection assembly further comprising a keeper coupled to the frame at the first end and configured to be engaged by the latch.

5. The gaming device of claim 1, wherein deflection of the arched portion against a compressive force of the wedge applies a force on the frame to secure the button deck assembly in position on the housing.

6. The gaming device of claim 1 further comprising a seal positioned between the button deck assembly and the housing, the seal sized to extend around at least a portion of a perimeter of the button deck assembly, wherein the seal is configured to be compressed by deflection of the arched portion when the button deck assembly is coupled to the housing and the arched portion of the wedge is engaged with the housing.

7. The gaming device of claim 6, wherein the seal is formed of an electrically conductive elastomer.

8. The gaming device of claim 1, wherein the housing further comprises a ledge at least partially defining the opening, the ledge being recessed from the exterior surface.

9. The gaming device of claim 8, wherein the button deck assembly further comprises a cover plate coupled to the frame of the button deck assembly, the cover plate positioned in alignment with the exterior surface when the button deck assembly is coupled to the housing.

10. The gaming device of claim 1, wherein the button deck assembly has a lateral length extending between the first end and the second end and a width extending from a front facing end to a rear face end of the button deck assembly, and wherein the lateral length of the button deck assembly is greater than the width.

11. A button deck assembly for use with a gaming device having a housing defining an internal cavity, the button deck assembly comprising:

a frame having a first lateral end and an opposed second lateral end, the frame sized to extend at least partially through an opening of the housing and into the internal cavity;

an input device coupled to the frame for receiving a player input; and a biasing wedge coupled to the frame and extending laterally outward from the frame proximate the second lateral end, the biasing wedge comprising an arched portion positioned to engage the housing, and wherein engagement of the arched portion with the housing causes the arched portion to deflect towards the frame of the button deck assembly to removably couple the button deck assembly to the housing.

12. The button deck assembly of claim 11 further comprising a keeper coupled to the frame proximate the first lateral end, the keeper configured to be removably engaged by a latch on the housing.

13. The button deck assembly of claim 11, wherein the arched portion is spaced from the frame to define a gap therebetween, the gap sized to receive a portion of the housing therein.

14. The button deck assembly of claim 11, wherein the arched portion is deflected against a compressive force of the biasing wedge, thereby applying a force on the button deck assembly to secure the button deck assembly in position on the housing.

15. The button deck assembly of claim 11 further comprising a cover plate coupled to the frame, the cover plate configured to be positioned in alignment with an exterior surface of the housing when the button deck assembly is coupled to the housing, and wherein a portion of the frame is positioned between the arched portion and the cover plate.

16. The button deck assembly of claim 11, wherein the input device includes at least one mechanical pushbutton.

17. A method of assembling a gaming device comprising:

positioning a frame of a button deck assembly within an opening of a housing of a gaming device such that the frame at least partially extends into a cavity of the housing, the frame extending laterally between a first end and a second end, the button deck assembly being configured to receive a player input, wherein the second end is opposed to the first end;

coupling the button deck assembly to the housing by engaging an arched portion of a biasing wedge of the button deck assembly with a ledge of the housing, the biasing wedge being coupled to the frame of the button deck assembly and extending laterally outward from the frame proximate the second end; and responsive to engaging the arched portion with the ledge, deflecting the arched portion towards the frame of the button deck assembly.

18. The method of claim 17 further comprising attaching a latch to a keeper at the first end of the frame to removably couple the button deck assembly to the housing.

19. The method of claim 17, wherein deflecting the arched portion comprises applying a compressive force against the biasing wedge and applying a force on the frame to secure the button deck assembly in position on the housing.

20. The method of claim 17 further comprising positioning a seal between the button deck assembly and the housing, the seal sized to extend around at least a portion of a perimeter of the button deck assembly, wherein the seal is configured to be compressed by deflection of the arched portion when the button deck assembly is coupled to the housing and the arched portion of the biasing wedge is engaged with the housing.

* * * * *